(12) United States Patent
Quan et al.

(10) Patent No.: US 8,773,987 B2
(45) Date of Patent: Jul. 8, 2014

(54) METHOD, DEVICE, AND SYSTEM FOR JUDGING RANDOM ACCESS CONTENTION RESOLUTION

(75) Inventors: Wei Quan, Shenzhen (CN); Yi Jiang, Shenzhen (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 434 days.

(21) Appl. No.: 13/283,288

(22) Filed: Oct. 27, 2011

(65) Prior Publication Data

US 2012/0039295 A1    Feb. 16, 2012

Related U.S. Application Data (63) Continuation of application No. PCT/CN2009/071496, filed on Apr. 27, 2009.

(51) Int. Cl.
| | | |
|---|---|---|
| H04L 1/00 | (2006.01) | |
| G06F 11/00 | (2006.01) | |
| H04W 4/00 | (2009.01) | |
| H04L 12/413 | (2006.01) | |
| H04W 8/26 | (2009.01) | |
| H04W 74/00 | (2009.01) | |
| H04W 28/04 | (2009.01) | |
| H04W 74/08 | (2009.01) | |

(52) U.S. Cl.
CPC .............. *H04W 74/085* (2013.01); *H04W 8/26* (2013.01); *H04W 74/004* (2013.01); *H04W 28/04* (2013.01); *H04W 74/0833* (2013.01)
USPC ........... 370/230; 370/235; 370/252; 370/332; 370/445

(58) Field of Classification Search
CPC ............ H04W 74/002; H04W 74/004; H04W 74/008; H04W 74/0816; H04W 74/0825; H04W 74/0833; H04W 74/085; H04W 28/0284–28/0294; H04W 74/08–74/0891; H04W 28/04–28/046
USPC ................. 370/229–238, 249–252, 310–350, 370/442–463
See application file for complete search history.

(56) References Cited

U.S. PATENT DOCUMENTS 7,903,818 B2 *   3/2011   Park et al. ...................... 380/270
(Continued)

FOREIGN PATENT DOCUMENTS

| CN | 1905522 A | 1/2007 |
|---|---|---|
| CN | 101772189 A | 7/2010 |

(Continued)

OTHER PUBLICATIONS

Supplementary European Search Report issued in corresponding European Patent Application No. 09 84 3852; dated Jun. 18, 2012.

(Continued)

*Primary Examiner* — Tri H Phan
(74) *Attorney, Agent, or Firm* — Brinks Gilson & Lione (57) ABSTRACT

Embodiments of the present invention disclose a method, device, and system for judging a random contention resolution. The method includes: sending a contention resolution request message to a network side, where the contention resolution request message carries a cell radio network temporary identifier (C-RNTI) or a common control channel serving data unit (CCCH SDU); and when receiving a network side message masked with a temporary C-RNTI (T C-RNTI) allocated by the network side to the UE before a CRT expires, performing backoff if judging, according to the C-RNTI or CCCH SDU and the signaling type of the network side message, that contention resolution fails.

15 Claims, 8 Drawing Sheets

(56) References Cited

U.S. PATENT DOCUMENTS

| | | | |
|---|---|---|---|
| 7,957,298 B2 * | 6/2011 | Yi et al. | 370/242 |
| 8,428,014 B2 * | 4/2013 | Cave et al. | 370/329 |
| 8,432,812 B2 * | 4/2013 | Park et al. | 370/236 |
| 8,467,343 B2 * | 6/2013 | Yi et al. | 370/329 |
| 8,477,634 B2 * | 7/2013 | Yi et al. | 370/242 |
| 8,493,994 B2 * | 7/2013 | Park et al. | 370/448 |
| 8,509,164 B2 * | 8/2013 | Park et al. | 370/329 |
| 2008/0310396 A1 | 12/2008 | Park et al. | |
| 2011/0116364 A1 * | 5/2011 | Zhang et al. | 370/216 |
| 2011/0261763 A1 * | 10/2011 | Chun et al. | 370/329 |
| 2013/0294310 A1 * | 11/2013 | Yi et al. | 370/311 |
| 2014/0016572 A1 * | 1/2014 | Cave et al. | 370/329 |

FOREIGN PATENT DOCUMENTS

| | | |
|---|---|---|
| WO | WO 2008054159 A2 | 5/2008 |
| WO | WO 2008/156276 A2 | 12/2008 |

OTHER PUBLICATIONS $3^{rd}$ Generation Partnership Project; Technical Specification Group Radio Access Network; Evolved Universal Terrestrial Radio Access (E-UTRA) Medium Access Control (MAC) Protocol Specification (Release 8) 3GPP TS 36.321. Mar. 2009.
Office Action issued in corresponding Chinese Patent Application No. 200980100822.4, mailed Mar. 21, 2013.
Search Report issued in corresponding Chinese Patent Application No. 2009801008224, mailed Mar. 21, 2013.
Office Action issued in corresponding Mexican Patent Application No. MX/a/2011/011456, mailed Jul. 4, 2013, 5 pages.
Written Opinion of the International Searching Authority issued in corresponding PCT Patent Application No. PCT/CN2009/071496, mailed Feb. 4, 2010.
International Search Report issued in corresponding PCT Patent Application No. PCT/CN2009/071496, mailed Feb. 4, 2010.
$3^{rd}$ Generation Partnership Project, "Change Request" 36.321 CR rev 8.5.0. 3GPP TSG-RAN2#65bis meeting. Seoul, Korea, Mar. 23-28, 2009. R2-092281.

* cited by examiner

METHOD, DEVICE, AND SYSTEM FOR JUDGING RANDOM ACCESS CONTENTION RESOLUTION

CROSS-REFERENCE TO RELATED APPLICATIONS

This application is a continuation of International Application No. PCT/CN2009/071496, filed on Apr. 27, 2009, which is hereby incorporated by reference in its entirety.

FIELD OF THE INVENTION

The present invention relates to the field of wireless communication, and in particular, to a method, device, and system for judging a random access contention resolution.

BACKGROUND OF THE INVENTION

In an LTE (Long Term Evolution, long term evolution) system, a UE (User Equipment, user equipment) obtains uplink synchronization and uplink resources through a random access procedure (Random Access Procedure). In a contention-based random access procedure, the UE randomly selects a RAP from a group of RAPs (Random Access Preambles, random access preambles) and initiates random access. After receiving a RAR (Random Access Response, random access response), the UE sends an Msg3 (the third message of the random access), and carries in the Msg3 a CCCH SDU (Common Control Channel Serving Data Unit, common control channel serving data unit) or a C-RNTI (Cell Radio Network Temporary Identifier, cell radio network temporary identifier) of the UE according to the purpose of initiating the random access. After sending the Msg3, the UE starts a CRT (Contention Resolution Timer, contention resolution timer). The UE considers that the contention is successful if receiving a contention resolution message before the CRT expires. The UE performs backoff for a period of time and reinitiates random access if the contention resolution fails after the CRT expires.

In the prior art, if it is a MAC (Media Access Control, media access control) of the UE that initiates the random access procedure, and the Msg3 transmits the C-RNTI, which is used as a control unit of the MAC, the UE considers that the contention resolution is successful after receiving UL Grant (uplink grant) that is sent by an eNB (Evolved NodeB, Evolved NodeB), masked with the C-RNTI and transmitted over new data; the UE considers that the contention resolution fails, performs backoff for a period of time, and reinitiates random access if receiving no UL Grant transmitted over the new data after the CRT expires.

However, in the prior art, during wait time after the UE sends the Msg3, if receiving DL Assignment or UL Grant, where the DL Assignment (downlink assignment) or UL Grant is masked with a T C-RNTI (Temporary C-RNTI) that is allocated by the eNB to the UE, the UE does not process the information, which may cause that the UE cannot timely judge whether the contention resolution is complete, and therefore, may cause that time for reinitiating random access is delayed.

SUMMARY OF THE INVENTION

Embodiments of the present invention provide a method, device, and system for judging a random access contention resolution, which can solve the problem of time delay of UE's successful random access during a contention-based random access procedure.

According to one aspect, a method for judging a random access contention resolution is provided, where the method includes:

sending a contention resolution request message to a network side, where the contention resolution request message carries: a C-RNTI allocated to a UE, or a CCCH SDU; and when receiving a network side message masked with a T C-RNTI temporarily allocated to the UE by the network side before a CRT expires, performing backoff if judging, according to the C-RNTI or the CCCH SDU, and a signaling type of the network side message, that contention resolution fails.

According to another aspect, a UE is provided, where the UE includes:

a transceiver unit, configured to send a contention resolution request message to a network side, where the contention resolution request message carries: a C-RNTI allocated to a UE, or a CCCH SDU;

a first judging unit, configured to judge, according to the C-RNTI or the CCCH SDU, and a signaling type of a network side message, whether contention resolution fails when the transceiver unit receives the network side message masked with a T C-RNTI temporarily allocated by the network side to the UE before a CRT expires;

a backoff unit, configured to perform backoff when the first judging unit judges that the contention resolution fails; and a CRT, configured to record whether time after the transceiver unit sends the contention resolution request message exceeds preset timeout wait time.

According to another aspect, a network system is provided, where the system includes:

a UE, configured to send a contention resolution request message to network equipment, where the contention resolution request message carries: a C-RNTI allocated to a UE, or a CCCH SDU; when receiving a network side message masked with a T C-RNTI temporarily allocated to the UE by the network equipment before a CRT expires, performing backoff if judging, according to the C-RNTI or the CCCH SDU, and a signaling type of the network side message, that contention resolution fails; and the network equipment, configured to receive the contention resolution request message sent by the UE and send the network side message masked with the T C-RNTI to the UE.

In the method, device, and system for judging a random access contention resolution disclosed according to the embodiments of the present invention, after the network side message masked with the T C-RNTI is received, whether the contention resolution fails is judged according to the C-RNTI or CCCH SDU, where the C-RNTI or CCCH SDU is carried in an Msg3 and the type of the network side message masked with the T C-RNTI. If a judgment result is that the contention resolution fails, the UE performs backoff in time. Therefore, a possible uplink sending error of the UE is avoided, and an uplink data sending failure that may be caused for another UE is also avoided. In addition, whether the contention resolution fails may be known before the wait time expires, so the time for reinitiating random access after the backoff is shortened and the success of the random access is accelerated.

DETAILED DESCRIPTION OF THE EMBODIMENTS

The following further describes a method, device, and system for judging a random access contention resolution in detail in combination with the accompanying drawings. It should be specified that, the described embodiments are merely part of rather than all of the embodiments of the present invention. Based on the embodiments of the present invention, all other embodiments obtained by those of ordinary skill in the art without creative efforts shall fall within the scope of the present invention.

In the prior art, during wait time after a UE sends an Msg3, if DL Assignment or UL Grant, where the DL Assignment or UL Grant is masked with a T C-RNTI temporarily allocated to the UE by an eNB, is received, the UE still cannot judge whether the contention resolution fails. For example, random access of a UE1 in a connected (connected) state and a UE2 in an idle (idle) state is triggered by a MAC, and a same RAP is sent at the same time and on a same PRACH (Physical Random Access Channel, physical random access channel) resource. Then, the UE1 and UE2 both receive a RAR from the eNB, where the RAR carries the T C-RNTI temporarily allocated to the UE. In addition, at this time, the UE1 considers that the RAR belongs to itself and the UE2 considers that the RAR belongs to itself, and record the T C-RNTI in the RAR message. The UE1 and UE2 send their respective Msg3 messages. The Msg3 sent by the UE1 includes a C-RNTI of the UE1, and the message sent by the UE2 carries a CCCH SDU. If the UE2 finally contends successfully, the UE2 receives a contention resolution response message MSG4. The message is notified by a PDCCH (Physical Downlink Control Channel, physical downlink control channel) command masked with the T C-RNTI temporarily allocated by the eNB to the UE2 in the RAR. At this time, the T C-RNTI temporarily allocated by the eNB becomes a formal C-RNTI of the UE2.

Before a CRT of the UE1 expires, the UE1 is still waiting for the contention resolution response message. At this time, if the eNB uses the C-RNTI of the UE2 to allocate UL Grant to the UE2, the UE1 considers that the C-RNTI as the T C-RNTI allocated by the eNB to itself, processes the UL Grant, and triggers uplink data sending. After the CRT of the UE1 expires, the UE1 considers that its contention resolution fails and performs backoff.

Uplink sending of the UE1 is interference for the UE2 and may result in an uplink sending failure of the UE2. Uplink sending of the UE1 may result in incorrect data processing for the UE1. Meanwhile, because the UE1 considers that its contention resolution fails after the CRT of the UE1 expires, time for re-initiating random access after the backoff may become longer correspondingly, which increases time delay of the random access.

Figure 1:
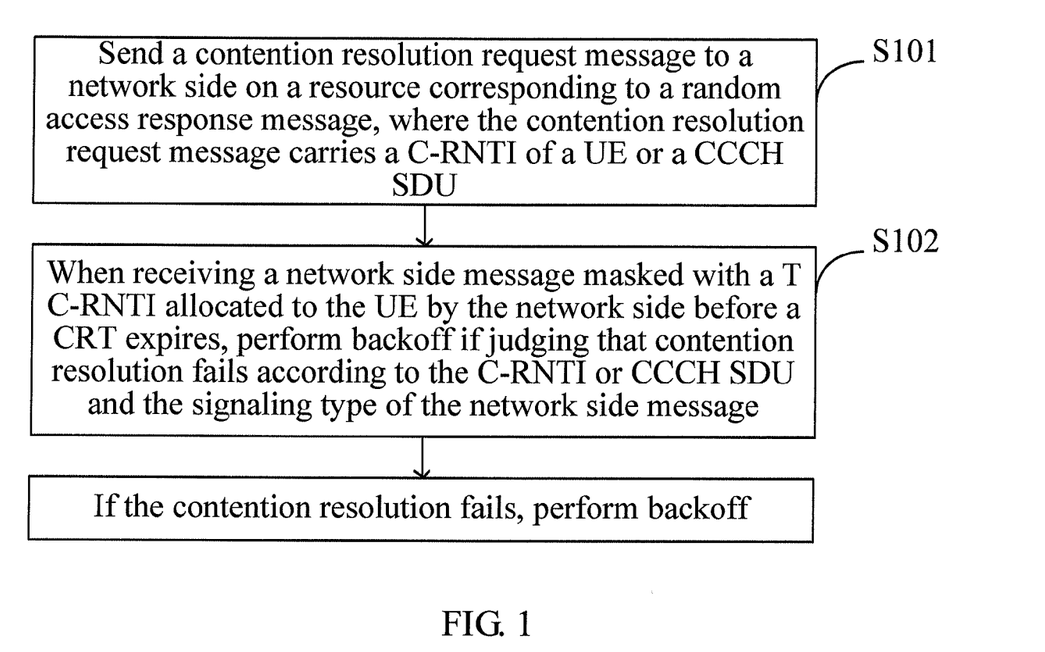
FIG. 1 is a flowchart of a method for judging a random access contention resolution according to an embodiment of the present invention.

As shown in FIG. 1, an embodiment of the present invention provides a method for judging a random access contention resolution, where the method includes:

S101: Send a contention resolution request message Msg3 to a network side on a resource corresponding to a random access response message, where the contention resolution request message carries a C-RNTI of a UE or a CCCH SDU.

S102: If receiving a network side message masked with a T C-RNTI temporarily allocated to the UE by the network side before wait time expires, judge, according to the C-RNTI or CCCH SDU, where the C-RNTI or CCCH SDU is carried in the contention resolution request message, and the signaling type of the network side message, whether the contention resolution fails.

S103: If the contention resolution fails, perform backoff.

The following gives more specific description through applications of the embodiments of the present invention in various scenarios. The sequence of the following embodiments does not represent a preferred order. In the following embodiments 1 to 3, a UE initiates a contention-based random access procedure through a MAC or a PDCCH command, and carries a C-RNTI in a contention resolution request message Msg3.

Embodiment 1

Figure 2:
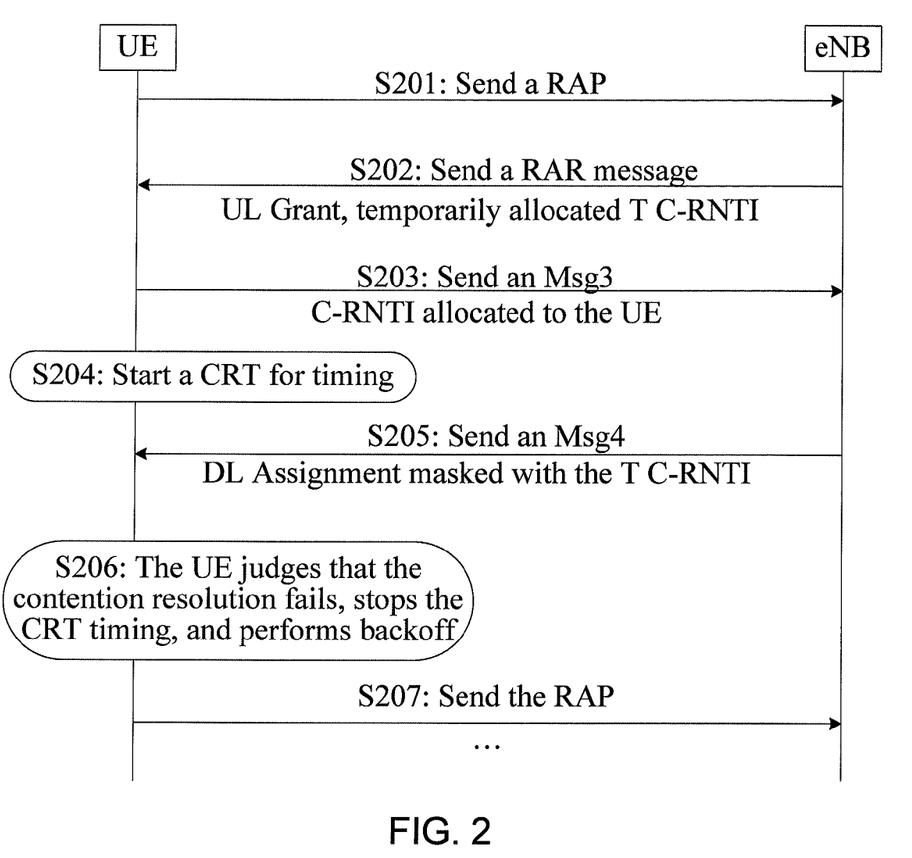
FIG. 2 is a schematic diagram according to a first embodiment of the present invention.

As shown in FIG. 2, this embodiment may include the following steps:

S201: A UE initiates contention-based random access, randomly selects an RAP and sends the RAP to an eNB. Specifically, the UE may initiate the contention-based random access through a MAC or a PDCCH command.

S202: The eNB sends an RAR message to the UE, where the RAR message may carry UL Grant and a T C-RNTI temporarily allocated by the eNB to the UE.

S203: The UE sends a contention resolution request message Msg3 to the eNB on a resource corresponding to the UL Grant, where the Msg3 carries the C-RNTI allocated to the UE, where the C-RNTI allocated to the UE is used as a MAC control unit of the Msg3.

S204: The UE may start a CRT while sending the Msg3, and wait for the UL Grant masked with the C-RNTI and transmitted over new data or DL Assignment masked with the C-RNTI so as to achieve the contention resolution.

In the scenario where the MAC initiates the random access, the UE waits for the UL Grant masked with the C-RNTI and transmitted over the new data. In the scenario where the PDCCH command initiates the random access, the UE waits for the DL Assignment masked with the C-RNTI.

S205: Before the CRT expires, the UE receives the DL Assignment (downlink assignment signaling) sent by the eNB and masked with the T C-RNTI temporarily allocated by the eNB.

S206: The UE considers that its contention resolution fails, stops the CRT timing, and performs backoff according to a related parameter, for example, backoff indicator (Backoff Indicator, BI) in the RAR message.

Because the UE desires to obtain the UL Grant masked with the C-RNRI and transmitted over the new data or the DL Assignment masked with the C-RNTI, the UE considers that the contention resolution fails after receiving the DL Assignment masked with the T C-RNTI.

A specific backoff process may be: in the foregoing S202, when the eNB sends the RAR message to the UE, the eNB carries backoff parameters in the message, such as 20 s. This parameter is the maximum time of the backoff. In this step, if the UE judges that its contention resolution fails, the UE selects a random value between 0 and the maximum time 20 s as the backoff time. For example, if the UE selects 10 s, the UE resends a RAP 10 s after the backoff.

S207: The UE resends the RAP after the backoff is performed for a period of time. The preceding steps S201 to S206 are repeated until the random access is successful or reaches a maximum time.

In this embodiment, before the CRT expires, the UE receives the DL Assignment masked with the T C-RNTI. The UE does not desire to receive this signaling. Therefore, the UE confirms that its contention resolution fails and performs backoff in time. A possible uplink data sending error is avoided, and an uplink data sending failure that may be caused for another UE is also avoided. The backoff can be performed in time, and the wait timeout time is saved.

Embodiment 2

Figure 3:
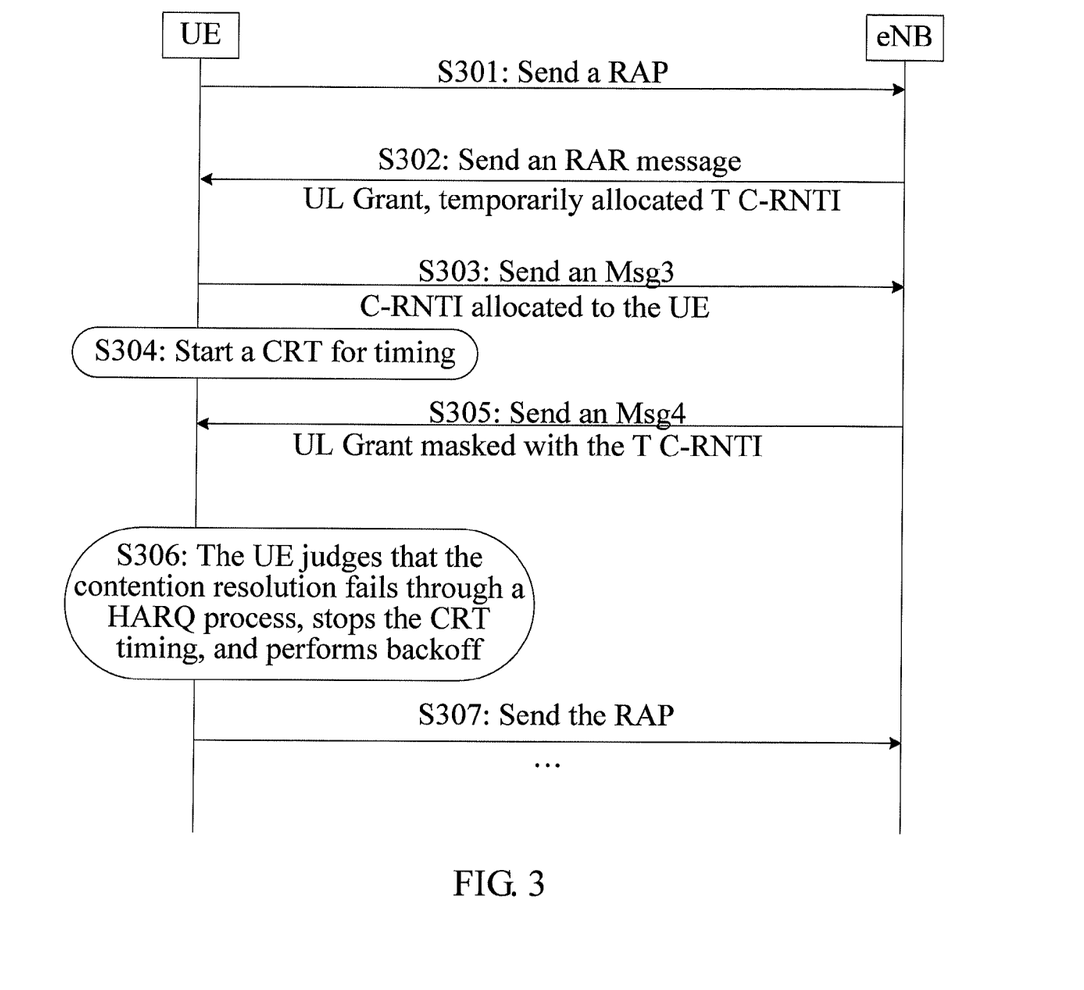
FIG. 3 is a schematic diagram according to a second embodiment of the present invention.

As shown in FIG. 3, this embodiment may include the following steps:

Steps S301 to S304 are the same as steps S201 to S204 in the first embodiment.

S305: Before the CRT expires, the eNB sends the UL Grant masked with the T C-RNTI temporarily allocated by the eNB to the UE.

S306: The UE judges whether a HARQ (Hybrid Automatic Repeat Request, hybrid automatic repeat request) process used in the UL Grant is consistent with that used for sending the Msg3. If the HARQ process used in the UL Grant is inconsistent with that used for sending the Msg3, the UE considers that its contention resolution fails, stops the CRT, and performs backoff according to a related parameter.

In this step, the HARQ process used in the UL Grant is inconsistent with that used for sending the Msg3, and therefore the UE obtains the result indicating that the contention resolution fails.

S307: The UE resends a RAP after the backoff is performed for a period of time. The preceding steps S301 to S306 are repeated until the random access is successful or reaches a maximum time.

In this embodiment, the UE receives the UL Grant masked with the temporarily allocated T C-RNTI and sent by the eNB before the CRT expires, and compares whether the HARQ process used in the UL Grant is consistent with that used for sending the Msg3 previously. The UE can judge whether its contention resolution fails according to the comparison result. Thus, an uplink data sending error, which is caused by that the UE mistakes that the contention resolution is successful without performing the judgment after receiving the UL Grant, is avoided, an uplink data sending failure, which may be caused for another UE, is also avoided, and a time delay, which is caused by that the UE confirms that the contention resolution fails only after the CRT expires, is also avoided at the same time.

In step 306 in this embodiment, after receiving the UL Grant masked with the T C-RNTI in S305, the UE may not judge whether the used HARQ process is consistent with that used for sending the Msg3. For example, the UE may determine whether the contention resolution fails by judging whether the size of a TB (Transport Block, transport block) sent by the UE specified in the UL Grant is the same as that of a TB used for sending the Msg3. If the UE judges that the size of the TB sent by the UE specified in the UL Grant is different from that of the TB used for sending the Msg3, the UE considers that its contention resolution fails, performs backoff, and reinitiates random access after the backoff is performed for a period of time.

Further, in step S306 in this embodiment, the UE may judge whether the contention resolution fails by using another mode: first judging whether the corresponding HARQ process in the UL Grant is consistent with that used for sending the Msg3; if the corresponding HARQ process in the UL Grant is consistent with that used for sending the Msg3, judging whether the size of the TB sent by the UE specified in the UL Grant is consistent with that of the TB used for sending the Msg3; and if the size of the TB sent by the UE specified in the UL Grant is inconsistent with that of the TB used for sending the Msg3, determining that the contention resolution of the UE fails and performing backoff in time.

There is also another method for judging whether the contention resolution fails. If receiving the UL Grant masked by using the temporarily allocated T C-RNTI and sent by the eNB before the CRT expires, the UE judges whether the corresponding HARQ process in the UL Grant is consistent with that used in the Msg3; if the corresponding HARQ process in the UL Grant is consistent with that used in the Msg3, the UE judges whether an NDI (New Data Indicator, new data indicator) in the UL Grant indicates new data transmission; and if the NDI indicates the new data transmission, the UE confirms that the contention resolution fails.

Whether the contention resolution fails may be judged through the HARQ process, the size of the TB specified for the UE to upload data, and whether the NDI indicates new data transmission. Whether the contention resolution fails may be determined according to one or multiple judging results. Thus, an uplink data sending error, which is caused by that the UE mistakes that the contention resolution is successful without performing the judgment after receiving the UL Grant, is avoided; an uplink data sending failure, which may be caused for another UE, is also avoided; and a time delay, which is caused by that the UE confirms that the contention resolution fails only after the CRT expires, is also avoided. The accuracy for judging whether the contention resolution fails is enhanced due to two judgments.

Embodiment 3

Figure 4A:
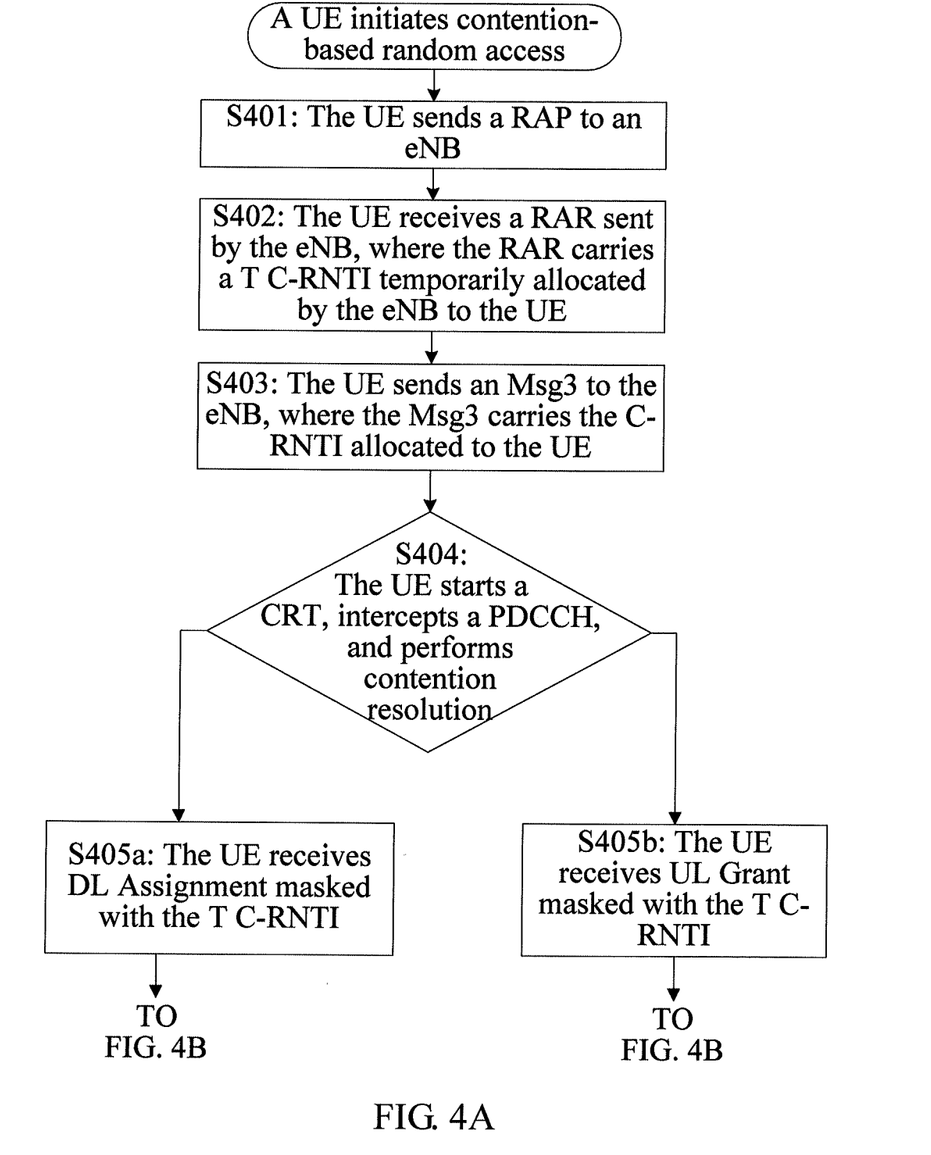
FIG. 4A is part of a flowchart according to a third embodiment of the present invention.
Figure 4B:
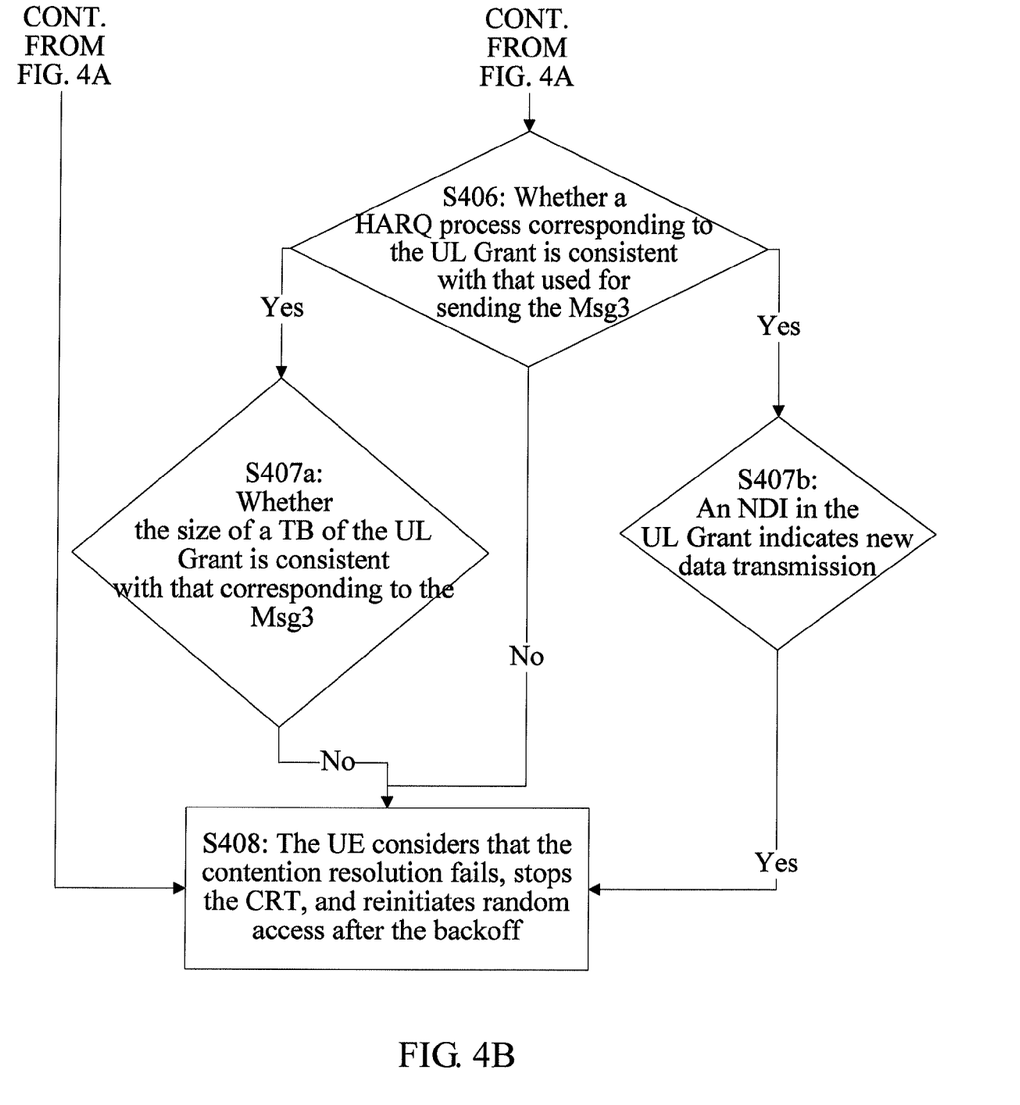
FIG. 4B is part of a flowchart according to a third embodiment of the present invention.

This embodiment is an improved solution obtained by combining various judging methods described in the first embodiment and the second embodiment. In this embodiment, contention-based random access is still initiated by a MAC of a UE or by a PDCCH command. Both of FIG. 4A and FIG. 4B are flowcharts according to this embodiment. The flowchart describes an entire flow mainly from a UE side. This embodiment may include the following steps:

S401: A UE sends a RAP to an eNB.

S402: The UE receives a RAR sent by the eNB, where the RAR carries a T C-RNTI temporarily allocated by the eNB to the UE.

S403: The UE initiates a contention resolution request message Msg3 to the eNB, where the Msg3 carries an allocated C-RNTI.

S404: After sending the Msg3, the UE starts a CRT for timing at the same time, intercepts a PDCCH, and performs contention resolution.

S405a: Before the CRT expires, the UE receives DL Assignment masked with the foregoing T C-RNTI and sent by the eNB.

Step S408 is then performed directly. Because the UE desires to obtain UL Grant masked with the C-RNTI or DL Assignment masked with the C-RNTI, but actually receives the DL Assignment masked with the T C-RNTI, the UE considers that its contention resolution fails, stops the CRT timing, performs backoff, and reinitiates random access after the backoff is performed for a set period of time.

S405b: Before the CRT expires, the UE receives the UL Grant masked with the foregoing T C-RNTI and sent by the eNB.

S406: The UE judges whether a HARQ process corresponding to the UL Grant is consistent with that used for sending the Msg3. When the HARQ process corresponding to the UL Grant is inconsistent with that used for sending the Msg3, step S408 may be directly performed.

If the HARQ process corresponding to the UL Grant is consistent with that used for sending the Msg3, step S407a or step S407b may be performed.

S407a: In the case that the HARQ process corresponding to the UL Grant is consistent with that used for sending the Msg3, the UE further judges whether the size of a TB used by the UE specified in the UL Grant to upload data is consistent with that of a TB used for sending the Msg3. If the size of the TB used by the UE specified in the UL Grant to upload data is inconsistent with that of the TB used for sending the Msg3, step S408 is performed.

S407b: When the HARQ process corresponding to the UL Grant is consistent with that used for sending the Msg3, the UE further judges whether an NDI in the UL Grant indicates new data transmission. If the NDI in the UL Grant indicates the new data transmission, step S408 is performed.

S408: If a negative result is obtained in S407a, or a positive result is obtained in S407b, or a negative result is obtained in S406, the UE considers that its contention resolution fails, stops the CRT timing, performs backoff, and reinitiates random access after the backoff is performed for a set period of time.

This embodiment completes the judgment of the random access contention resolution of the UE through an improved solution, so that the UE can judge the type of the contention resolution response message fed back by the eNB after the Msg3. If the response message is the DL Assignment masked with the T C-RNTI, the UE draws the conclusion that the contention resolution fails and performs backoff to avoid timeout wait. If the response message is the UL Grant masked with the T C-RNTI, the UE can perform the judgment according to a corresponding item in the Msg3 sent by the UE and one or multiple of the following items: the HARQ process used in the UL Grant and included in the UL Grant, the size of the TB used by the UE specified in the UL Grant to transmit uplink data, and the NDI in the UL Grant. Thus, the UE can accurately judge whether the contention resolution fails. An uplink data error or wait timeout, where the uplink data error or wait timeout is caused by incorrect judgment by the UE, is avoided, and an uplink data sending failure that may be caused for another UE is also avoided. Thus, the network system performance is optimized and time for user successful access is saved.

The following fourth embodiment and fifth embodiment describe a method for judging a contention resolution when a UE needs to carry a CCCH SDU in an Msg3. After sending the Msg3, the UE desires to obtain DL Assignment masked with a T C-RNTI.

Embodiment 4

This embodiment is similar to the second embodiment and also includes steps S301 to S307 in the second embodiment.

In this embodiment, an Msg3 sent in step S303 carries a CCCH SDU rather than a C-RNTI. In step S306, a UE uses different judging criteria to judge, according to a received UL Grant, whether contention resolution fails.

Specifically, in this embodiment, after sending the Msg3, the UE starts CRT timing and receives the UL Grant masked with a temporarily allocated T C-RNTI and sent by the eNB, before the CRT expires. At this time, the UE judges whether a HARQ process used in the UL Grant is consistent with that used for sending the Msg3. If the HARQ process used in the UL Grant is inconsistent with that used for sending the Msg3, the UE considers that its contention resolution fails, stops the CRT, and performs backoff according to a related parameter.

In this step, the UE judges and obtains the conclusion that the HARQ processes are inconsistent, therefore the UE obtains the result that the contention resolution fails, performs backoff, and reinitiates the RAP after the backoff is performed for a period of time until the random access is successful or reaches a maximum time.

In this embodiment, the UE receives the UL Grant masked with the temporarily allocated T C-RNTI and sent by the eNB before the CRT expires, and compares whether the HARQ process used in the UL Grant is consistent with that used for sending the Msg3 previously. The UE can judge whether its contention resolution fails according to the comparison result. Thus, an uplink data sending error, which is caused by that the UE mistakes that the contention resolution is successful without performing the judgment after receiving the UL Grant, is avoided; an uplink data sending failure, which may be caused for another UE, is also avoided; and a time delay, which is caused by that the UE confirms that the contention resolution fails only after the CRT expires, is also avoided at the same time.

Same as the preceding second embodiment, in S306, other judging methods may also be used to judge whether the contention resolution fails. Reference may be made to the following description for some other judging methods.

In step S306 in this embodiment, after receiving the UL Grant masked with the T C-RNTI in S305, the UE may not judge whether the used HARQ process is consistent with that used for sending the Msg3. For example, the UE may determine whether the contention resolution fails by judging whether the size of a TB sent by the UE specified in the UL Grant is the same as that of a TB used for sending the Msg3. If judging that the size of the TB sent by the UE specified in the UL Grant is different from that used for sending the Msg3, the UE considers that its contention resolution fails, performs backoff, and reinitiates the random access after the backoff is performed for a period of time.

There is also another method for judging whether the contention resolution fails. If receiving the UL Grant masked by using the temporarily allocated T C-RNTI and sent by the eNB before the CRT expires, the UE judges whether the corresponding HARQ process in the UL Grant is consistent with that used in the Msg3; if the corresponding HARQ process in the UL Grant is consistent with that used in the Msg3, the UE judges whether the size of the TB sent by the UE specified in the UL Grant is consistent with that of the TB used for sending the Msg3. If the UE judges that the size of the TB sent by the UE specified in the UL Grant is different from that of the TB used for sending the Msg3, the UE considers that its contention resolution fails, performs backoff, and reinitiates random access after the backoff is performed for a period of time.

There is also another method for judging whether the contention resolution fails. If receiving the UL Grant masked by using the temporarily allocated T C-RNTI and sent by the eNB before the CRT expires, the UE judges whether the corresponding HARQ process in the UL Grant is consistent with that used in the Msg3; if the corresponding HARQ process in the UL Grant is consistent with that used in the Msg3, the UE judges whether an NDI in the UL Grant indicates new data transmission; and if the NDI indicates the new data transmission, the UE confirms that the contention resolution fails.

Whether the contention resolution fails may be judged through the HARQ process, the size of the TB specified for the UE to upload data, and whether the NDI indicates the new data transmission. Whether the contention resolution fails is determined according to one or multiple judging results. Thus, an uplink data sending error, which is caused by that the UE mistakes that the contention resolution is successful without performing the judgment after receiving the UL Grant, is avoided; an uplink data sending failure, which may be caused for another UE, is also avoided; and a time delay, which is caused by that the UE confirms that the contention resolution fails only after the CRT expires, is also avoided. The accuracy for judging whether the contention resolution fails is enhanced due to two judgments.

Embodiment 5

This embodiment is an improved solution obtained by combining various possible judging methods described in the fourth embodiment. This embodiment is still directed to contention-based random access and carries a CCCH SDU rather than a C-RNTI in an Msg3.

Figure 5A:
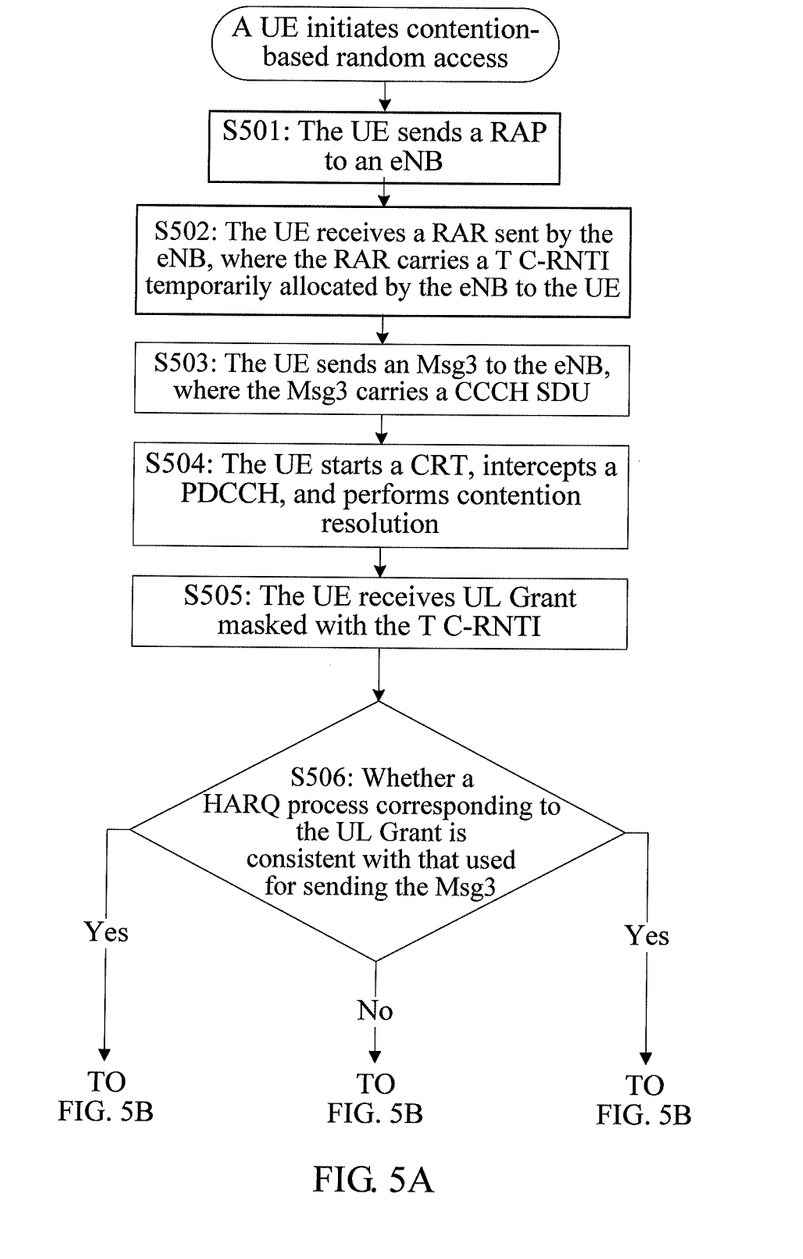
FIG. 5A is part of a flowchart according to a fifth embodiment of the present invention.
Figure 5B:
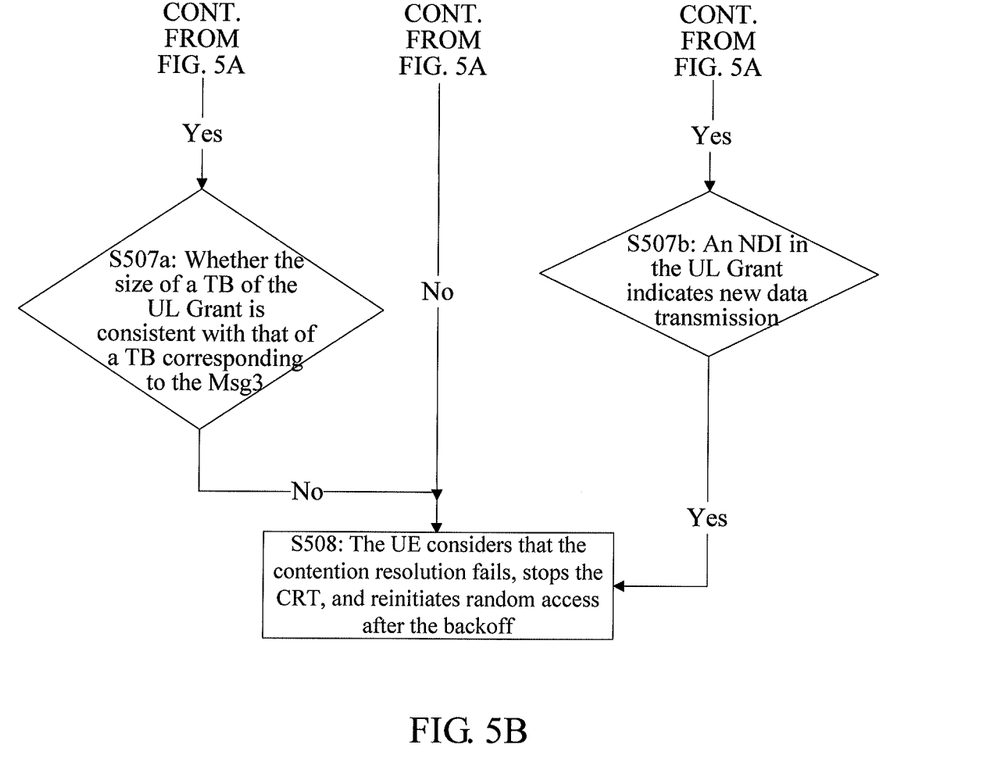
FIG. 5B is part of a flowchart according to a fifth embodiment of the present invention.

Both of FIG. 5A and FIG. 5B are flowcharts according to this embodiment. The flowchart describes an entire process from a UE side. This embodiment may include the following steps:

S501: A UE sends a RAP to an eNB.

S502: The UE receives a RAR sent by the eNB, where the RAR carries a T C-RNTI allocated by the eNB to the UE.

S503: The UE sends a contention resolution request message Msg3 to the eNB, where the Msg3 carries a CCCH SDU.

S504: After sending the Msg3, the UE starts a CRT for timing at the same time, intercepts a PDCCH, and performs contention resolution.

S505: Before the CRT expires, the UE receives UL Grant masked by using the foregoing T C-RNTI and sent from the eNB.

S506: The UE judges whether a HARQ process corresponding to the UL Grant is consistent with that used for sending the Msg3. When the HARQ process corresponding to the UL Grant is inconsistent with that used for sending the Msg3, step S508 may be directly performed.

If the HARQ process corresponding to the UL Grant is consistent with that used for sending the Msg3, step S507a or S507b may be performed.

S507a: In the case that the HARQ process corresponding to the UL Grant is consistent with that used for sending the Msg3, the UE further judges whether the size of a TB used by the UE specified in the UL Grant to upload data is consistent with that of a TB used for sending the Msg3. If the size of the TB used by the UE specified in the UL Grant to upload data is inconsistent with that of the TB used for sending the Msg3, step S508 is performed.

S507b: If the HARQ process corresponding to the UL Grant is consistent with that used for sending the Msg3, the UE further judges whether an NDI in the UL Grant indicates new data transmission. If the NDI in the UL Grant indicates the new data transmission, step S508 is performed.

S508: In the case that a negative result is obtained in S507a, or a positive result is obtained in S507b, or a negative result is obtained in S506, the UE may consider that its contention resolution fails, stops the CRT timing, performs backoff, and reinitiates random access after the backoff is performed for a set period of time.

This embodiment completes the judgment of the random access contention resolution of the UE through an improved solution, so that after sending the Msg3 that carries the CCCH SDU, if receiving the UL Grant masked with the T C-RNTI, the UE can perform the judgment according to a corresponding item in the Msg3 sent by the UE and one or multiple of the following items: the HARQ process used in the UL Grant and included in the UL Grant, the size of the TB used by the UE specified in the UL Grant to transmit uplink data, and the NDI in the UL Grant. Thus, the UE can accurately judge whether the contention resolution fails. An uplink data error or wait timeout, where the uplink data error or wait timeout is caused by incorrect judgment by the UE is avoided, and an uplink data sending failure that may be caused for another UE is also avoided. Thus, the network system performance is optimized and time for user successful access is saved.

Persons of ordinary skill in the art may understand that all or part of the processes of the method according to the foregoing embodiments may be implemented by a computer program instructing relevant hardware. The program may be stored in a computer readable storage medium. When the program is executed, the processes of the method according to the foregoing embodiments may be performed. The storage medium may be a magnetic disk, a compact disk, a Read-Only Memory (ROM) or a Random Access Memory (RAM).

Figure 6:
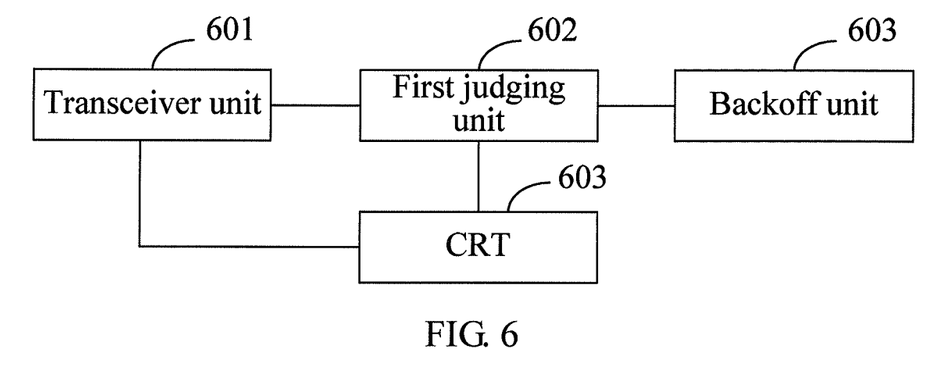
FIG. 6 is a schematic diagram of a UE according to an embodiment of the present invention.

As shown in FIG. 6, an embodiment of the present invention also provides a UE, including: a transceiver unit 601, configured to send a contention resolution request message to a network side, where the contention resolution request message carries a C-RNTI allocated to a UE or a CCCH SDU; a first judging unit 602, configured to judge, according to the C-RNTI or CCCH SDU and a signaling type of a network side message, whether contention resolution fails when receiving the network side message masked with a T C-RNTI allocated by the network side to the UE before a CRT 604 expires; a backoff unit 603, configured to perform backoff when the first judging unit 602 judges that the contention resolution fails; and the CRT 604, configured to record whether time after the transceiver unit 601 sends the contention resolution request message exceeds preset timeout wait time.

If the transceiver unit 601 carries the C-RNTI in an Msg3 and receives DL Assignment masked with the T C-RNTI, the first judging unit 602 may determine that the contention resolution fails. If the transceiver unit 601 receives UL Grant masked with the T C-RNTI, the first judging unit 602 cannot conclude whether the contention resolution fails and a second judging unit is needed to further judge whether the contention resolution fails.

If the transceiver unit 601 carries the CCCH SDU in the Msg3 and receives the UL Grant masked with the T C-RNTI, the first judging unit 602 cannot conclude whether the contention resolution fails and a second judging unit is needed to further judge whether the contention resolution fails, because the UL Grant may also be a retransmission request although the UE desires to obtain the DL Assignment masked with the T C-RNTI.

Therefore, on the basis of the foregoing technical solutions, the UE may further include: a second judging unit, configured to, when the first judging unit fails to judge that the contention resolution fails, judge whether the contention resolution fails according to one or multiple of the following items: a HARQ process corresponding to the network side message masked with the T C-RNTI, the size of a TB specified to be used by the UE, and an NDI.

Specifically, reference may be made to the foregoing embodiments 1 to 6 of the method for judging a random access contention resolution for methods used by the first judging unit 601 and the second judging to judge whether the contention resolution fails, so as to achieve the random access of the UE.

Figure 7:
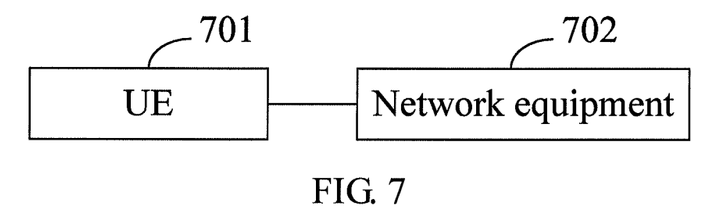
FIG. 7 is a schematic diagram of a network system according to an embodiment of the present invention.

As shown in FIG. 7, an embodiment of the present invention also provides a network system, including: a UE 701, configured to send a contention resolution request message to network equipment 702, where the contention resolution request message carries a C-RNTI allocated to a UE or a CCCH SDU; when receiving a network side message masked with a T C-RNTI allocated by the network equipment 702 to the UE before a CRT expires, perform backoff if judging, according to the C-RNTI or CCCH SDU and the signaling type of the network side message, that contention resolution fails; and the network equipment 702, configured to receive the contention resolution request message sent by the UE and send the network side message masked with the T C-RNTI to the UE.

According to the device and system for judging a random access contention resolution in the embodiments of the present invention, after the network side message masked with the T C-RNTI is received, whether the contention resolution fails is judged according to the C-RNTI or CCCH SDU, where the C-RNTI or CCCH SDU is carried in the Msg3 and the type of the network side message masked with the T C-RNTI. If the judgment result indicates that the contention resolution fails, the UE performs backoff in time. Thus, a possible uplink sending error of the UE is avoided, and an uplink data sending failure that may be caused for another UE is also avoided. In addition, time for reinitiating random access after the backoff can be shortened and the success of the random access is accelerated because whether the contention resolution fails may be known before the wait time expires.

Other Embodiments

Embodiment 6

A method for judging a random access contention resolution, comprising:
sending a contention resolution request message to a network side, wherein the contention resolution request message carries: a cell radio network temporary identifier (C-RNTI) allocated to a user equipment (UE), or a common control channel serving data unit (CCCH SDU); and when receiving a network side message masked with a temporary C-RNTI (T C-RNTI) temporarily allocated by the network side to the UE before a contention resolution timer (CRT) expires, performing backoff if judging, according to the C-RNTI or the CCCH SDU, and a signaling type of the network side message, that contention resolution fails.

Embodiment 7

The method according to the embodiment 6, wherein the contention resolution request message carries the C-RNTI, the if judging, according to the C-RNTI and the signaling type of the network side message, that the contention resolution fails specifically comprises: confirming that the contention fails if the signaling type of the network side message is a downlink Assignment signaling; or if the signaling type of the network side message is an uplink Grant signaling, judging that the contention resolution fails according to one or multiple of following items each of which corresponds to the uplink Grant signaling: a hybrid automatic repeat request (HARQ) process, size of a transport block (TB) specified to be used by the UE, and a new data indicator (NDI).

Embodiment 8

The method according to Embodiment 6, wherein the contention resolution request message carries the CCCH SDU, the if judging, according to the CCCH SDU and the signaling type of the network side message, that the contention resolution fails specifically comprises: if the signaling type of the network side message is an uplink Grant signaling, judging that the contention resolution fails according to one or multiple of following items each of which corresponds to the uplink Grant signaling: a hybrid automatic repeat request (HARQ) process, size of a transport block (TB) specified to be used by the UE, and a new data indicator (NDI).

Embodiment 9

The method according to embodiment 7 or 8 wherein the judging that the contention resolution fails according to one or multiple of following items each of which corresponds to the uplink Grant signaling: the HARQ process, the size of the TB specified to be used by the UE, and the NDI comprises: judging whether the HARQ process corresponding to the uplink Grant signaling is consistent with a HARQ process used in the contention resolution request message, and if the HARQ process corresponding to the uplink Grant signaling is inconsistent with the HARQ process used in the contention resolution request message, confirming that the contention resolution fails; or judging whether the size of the TB used by the UE and specified in the uplink Grant signaling is consistent with size of a TB used in the contention resolution request message, and if the size of the TB used by the UE and specified in the uplink Grant signaling is inconsistent with the size of the TB used in the contention resolution request message, confirming that the contention resolution fails.

Embodiment 10

The method according to embodiment 7 or 8, wherein the judging that the contention resolution fails according to one or multiple of following items each of which corresponds to the uplink Grant signaling: the HARQ process, the size of the TB specified to be used by the UE, and the NDI comprises: judging whether the HARQ process corresponding to the uplink Grant signaling is consistent with the HARQ process used in the contention resolution request message; if the HARQ process corresponding to the uplink Grant signaling is consistent with a HARQ process used in the contention resolution request message, the method further comprises: judging whether the size of the TB used by the UE specified in the uplink Grant signaling is consistent with size of a TB used in the contention resolution request message, and if the size of the TB used by the UE specified in the uplink Grant signaling is inconsistent with the size of the TB used in the contention resolution request message, confirming that the contention fails; or judging whether the NDI in the uplink Grant signaling indicates new data transmission, if the uplink Grant signaling indicates the new data transmission, confirming that the contention resolution fails.

Embodiment 11

A user equipment (UE), comprising: a transceiver unit, configured to send a contention resolution request message to a network side, wherein the contention resolution request message carries: a cell radio network temporary identifier (C-RNTI) allocated to the UE, or a common control channel serving data unit (CCCH SDU); a first judging unit, configured to judge, according to the C-RNTI or the CCCH SDU, and a signaling type of a network side message, whether contention resolution fails when receiving the network side message masked with a temporary C-RNTI (T C-RNTI) temporarily allocated by the network side to the UE before a contention resolution timer (CRT) expires; a backoff unit, configured to perform backoff when the first judging unit judges that the contention resolution fails; and a contention resolution timer (CRT), configured to record whether time after the transceiver unit sends the contention resolution request message exceeds preset timeout wait time.

Embodiment 12

The UE according to Embodiment 11, wherein the UE further comprises: a second judging unit, configured to, when a judging outcome of the first judging unit cannot determine that the contention resolution fails, judge whether the contention resolution fails according to one or multiple of following items each of which corresponds to the network side message masked with the T C-RNTI: a hybrid automatic repeat request (HARQ) process size of a transport block (TB) specified to be used by the UE, and a new data indicator (NDI); the backoff unit is further configured to perform backoff when the second judging unit judges that the contention resolution fails.

Embodiment 13

A network system, comprising: a user equipment (UE), configured to send a contention resolution request message to a network equipment, wherein the contention resolution request message carries: a cell radio network temporary identifier (C-RNTI) allocated to the UE; or a common control channel serving data unit (CCCH SDU); when receiving a network side message masked with a temporary C-RNTI (T C-RNTI) temporarily allocated by the network equipment to the UE before a contention resolution timer (CRT) expires, perform backoff if judging, according to the C-RNTI or the CCCH SDU, and a signaling type of the network side message, that contention resolution fails; and the network equipment, configured to receive the contention resolution request message sent by the UE and send the network side message masked with the T C-RNTI to the UE.

The foregoing is merely exemplary embodiments of the present invention, and is not intended to limit the scope of the present invention. Variations or replacements that may be easily derived by persons skilled in the prior art within the technical scope disclosed in the present invention should fall within the scope of the present invention. Therefore, the protection scope of the present invention is subjected to the appended claims.

The invention claimed is:

1. A method, comprising:
sending, by a user equipment (UE), a first message to a network side;
receiving, by the UE, a second message masked with a temporary Cell Radio Network Temporary Identifier (T C-RNTI) temporarily allocated by the network side to the UE, wherein the second message is received before a contention resolution timer (CRT) expires;
determining, by the UE, according to the first message and the second message, that a contention resolution fails; and
subsequent to the contention resolution failure determination, performing, by the UE, a backoff before the contention resolution timer (CRT) expires.

2. The method according to claim 1, wherein the first message carries a cell radio network temporary identifier (C-RNTI), the second message is a downlink Assignment signaling, and the determining comprises:
determining, by the UE, according to the C-RNTI of the first message and the T C-RNTI masking the second message, that a contention resolution fails.

3. The method according to claim 1, wherein the second message is an uplink grant signaling, and the determining comprises:
determining, by the UE, when the hybrid automatic repeat request (HARQ) process corresponding to the first message is inconsistent with the HARQ process corresponding to the second message, that a contention resolution fails.

4. The method according to claim 1, wherein the second message is an uplink grant signaling, and the determining comprises:
determining, by the UE, when the hybrid automatic repeat request (HARQ) process corresponding to the first message is consistent with the HARQ process corresponding to the second message, and a size of a transport block (TB) of the first message is inconsistent with a size of a TB of the second message, that a contention resolution fails.

5. The method according to claim 1, wherein the second message is an uplink grant signaling, and the determining comprises:
determining, by the UE, when the hybrid automatic repeat request (HARQ) process corresponding to the first message is consistent with the HARQ process corresponding to the second message, and a new data indicator (NDI) in the second message indicates a new data transmission, that a contention resolution fails.

6. The method according to claim 1, wherein the first message is a contention resolution request message.

7. The method according to claim 1, wherein the first message carries a common control channel serving data unit (CCCH SDU).

8. A user equipment (UE), comprising:
a unit that receives a first message to a network side;
a unit that receives a second message masked with a temporary Cell Radio Network Temporary Identifier (T C-RNTI) temporarily allocated by the network side to the UE, wherein the second message is received before a contention resolution timer (CRT) expires;
a unit that determines according to the first message and the second message, that a contention resolution fails; and
a unit that performs a backoff subsequent to the contention resolution failure determination, wherein the backoff takes place before the contention resolution timer (CRT) expires.

9. The UE according to claim 8, wherein the first message carries a cell radio network temporary identifier (C-RNTI), the second message is a downlink Assignment signaling, and the UE further comprises:
a unit that determines, according to the C-RNTI of the first message and the T C-RNTI masking the second message, that a contention resolution fails.

10. The UE according to claim 8, wherein the second message is an uplink grant signaling, and the UE further comprises:
a unit that determines, when the hybrid automatic repeat request (HARQ) process corresponding to the first message is inconsistent with the HARQ process corresponding to the second message, that a contention resolution fails.

11. The UE according to claim 8, wherein the second message is an uplink grant signaling, and the UE further comprises:
a unit that determines, when the hybrid automatic repeat request (HARQ) process corresponding to the first message is consistent with the HARQ process corresponding to the second message, and a size of a transport block (TB) of the first message is inconsistent with a size of a TB of the second message, that a contention resolution fails.

12. The UE according to claim 8, wherein the second message is an uplink grant signaling, and the UE further comprises:
a unit that determines, when the hybrid automatic repeat request (HARQ) process corresponding to the first message is consistent with the HARQ process corresponding to the second message, and a new data indicator (NDI) in the second message indicates a new data transmission, that a contention resolution fails.

13. A tangible non-transitory computer-readable media comprising computer executable instructions, wherein the computer executable instructions, when executed by a processor, perform the steps of:
sending, by a user equipment (UE), a first message to a network side;
receiving, by the UE, a second message masked with a temporary Cell Radio Network Temporary Identifier (T C-RNTI) temporarily allocated by the network side to the UE;
determining, by the UE, according to the first message and the second message, that a contention resolution fails; and
performing, by the UE, a backoff, wherein the second message is received before a contention resolution timer (CRT) expires.

14. A processor, stored in a user equipment (UE), wherein the processor is configured to:
send a first message to a network side;
receive a second message masked with a temporary Cell Radio Network Temporary Identifier (T C-RNTI) temporarily allocated by the network side to the UE;
determine according to the first message and the second message, that a contention resolution fails; and
perform a backoff, wherein the second message is received before a contention resolution timer (CRT) expires.

15. A network system, comprising a user equipment (UE) and a network equipment, wherein:
the UE is configured to send a first message to a network side, receive a second message masked with a temporary Cell Radio Network Temporary Identifier (T C-RNTI) temporarily allocated by the network side to the UE, determine according to the first message and the second message, that a contention resolution fails, and perform a backoff, wherein the second message is received before a contention resolution timer (CRT) expires; and
the network equipment is configured to receive the first message sent by the UE and send the second message masked with the T C-RNTI to the UE.

* * * * *